United States Patent [19]
Kimura et al.

[11] Patent Number: 5,825,736
[45] Date of Patent: Oct. 20, 1998

[54] OPTICAL DISK APPARATUS

[75] Inventors: Isao Kimura, Tokyo; Shinichi Tanaka, Kamakura; Hiroyuki Oshikiri, Tokyo, all of Japan

[73] Assignee: Nikon Corporation, Tokyo, Japan

[21] Appl. No.: 795,794

[22] Filed: Feb. 5, 1997

[30] Foreign Application Priority Data

| Feb. 7, 1996 | [JP] | Japan | ................................. | 8-020994 |
| Jun. 19, 1996 | [JP] | Japan | ................................. | 8-157975 |
| Jul. 19, 1996 | [JP] | Japan | ................................. | 8-190446 |
| Dec. 18, 1996 | [JP] | Japan | ................................. | 8-338043 |

[51] Int. Cl.$^6$ .................................................... G11B 7/00
[52] U.S. Cl. ................................. 369/59; 369/58; 369/50
[58] Field of Search ................................. 369/59, 41, 48, 369/49, 50, 54, 58, 60, 32, 53

[56] References Cited

U.S. PATENT DOCUMENTS 5,541,960  7/1996  Setomura et al. ..................... 369/59 X

*Primary Examiner*—Muhammad N. Edun
*Attorney, Agent, or Firm*—Shapiro and Shapiro

[57] ABSTRACT

An optical disk apparatus has a data recording circuit for recording user data in a data portion of a sector on an optical disk. The optical disk is formed with a plurality of tracks in a concentric circular shape or spiral shape on the surface thereof and is possible of data write based on a sector unit. Each track is segmented into a plurality of sectors. The apparatus also has a detection circuit for detecting a resynchro pattern recorded together with user data from a regenerative signal obtained from the data portion of a sector before recording user data in the sector, a count circuit for counting a number of resynchro patterns detected, and an overwrite preventive circuit for stopping recording data on the sector when a count value of the count circuit is not less than a predetermined value.

13 Claims, 12 Drawing Sheets

OPTICAL DISK APPARATUS

The entire disclosure of Japanese Patent Application Nos. 8-20994, 8-157975, 8-190446 and 8-338043 including specifications, claims, drawings and summaries is incorporated herein by reference in their entirety.

BACKGROUND OF THE INVENTION

1. Field of the Invention

The present invention relates to an optical disk apparatus for recording user data on an optical disk. The present invention also relates to an optical recording apparatus for recording and regenerating data on and from a recording medium.

2. Related Background Art

An optical disk apparatus for recording data on a recording medium such as an optical disk is a digital information recording apparatus for recording bit information by irradiating the recording medium with laser beams while applying an outside magnetic field thereto and thereby reversing a magnetizing direction thereof. Normally, when recording the data on the optical disk, to begin with, magnetizations of recording areas thereof are lined up in a fixed direction, thus deleting the data. Thereafter, magnetization reversed areas are partially created by blinking-irradiation of the laser beams, and the digital information are recorded. Therefore, the data already recorded in the area is deleted, and new information can be recorded in this area. Thus, a characteristic of the optical disk apparatus is that the data can be written to the optical disk, or alternatively the data in the relevant area can be rewritten, and therefore the optical disk apparatus is also called a rewrite type optical disk apparatus.

In contrast with this, there is a recording apparatus for recording digital information by partially changing a physical structure of the recording medium. A general change in terms of the physical structure used in the actual recording apparatus involves, e.g., a change in configuration or a chemical alteration of material. These changes are unreversible, and hence the data can be rewritten by newly deleting the area already recorded with the information. A magneto-optic disk storage apparatus capable of writing once is generally referred to as a data additional writing type optical disk apparatus.

In the data additional writing type optical disk apparatus, protection is provided by hardware to prevent the data from being overwritten.

By the way, depending on users, there might be needed a system wherein the data is not required to be rewritten, and the previously recorded data is prevented from being mistakenly erased. For example, as for records of articles of newspaper or documentary materials, the records may be perused but are not required to be rewritten, or rather a system with no possibility of being deliberately rewritten might be more advantageous in the great majority of cases. When the magneto-optic disk is employed for this application, the advantage of being "rewritable" paradoxically turns out to be a problem. At the present, the overwrite is inhibited by limiting an attribute of a predetermined file within the recording medium to read-only in the prevailing operation system (OS).

This is, however, simply controlled by software in the OS on the computer, but it does not mean that a drive device itself recognizes the overwrite and protects the data. Accordingly, this might be accompanied by such a possibility that the data is deleted due to a bug of the OS program and alteration of the file attribute.

Further, in the data additional writing type once-writable disk apparatus also, if the recording is again performed by irradiating a once-recorded area with intensified laser beams, the data recorded might be damaged.

The optical disk apparatus is capable of erasing the once-written information and writing new information as described above. A system desired in some cases may be, however, a system contrived for such an application that the once-written information can not be deleted at all. The case of the optical disk apparatus is unsuitable for the above application, because it might happen that the user carelessly deletes the data.

Therefore, the data additional writing type optical disk apparatus is effective in the above application. In recent years, however, an optical disk apparatus corresponding to CCW (Continuous Composite Write Once) has been developed and come into gradual use, wherein a function to permit only once writing is added to the optical disk apparatus, and this apparatus can be thereby used also as the data additional writing type optical disk apparatus.

In this CCW corresponding optical disk apparatus, as in the case of the data additional writing type optical disk apparatus, the data overwrite is protected by hardware.

The following are two methods of protecting the overwrite.

To start with, a first protecting method will be explained. FIG. 1 illustrates a principal internal configuration of the sector on the recording medium. Referring to FIG. 1, an ID area 1 is an area in which a sector address is recorded. A data portion 3 is an area recorded with user data. Further, a flag area 2 located just anterior to the data portion 3 is an area, for recording data indicating whether or not data has already been written to that sector, to which a specified pattern is written after writing the data to the data portion 3. Accordingly, in the CCW corresponding optical disk apparatus, the data in the flag area 2 is read just before recording the user data. If the specified pattern is written, it is judged that the data is unwritable, and the recording process is suspended.

Next, a second protecting method is a method, wherein there is provided an SWF (Sector Written Flag) area 4 defined as a write area for data indicating whether or not data has already been written to a part of the data portion 3, and the above judgement is made by recording the SWF area 4 with a specified item of data such as, e.g., "FF" in a hexadecimal notation.

That is, a data pattern such as, e.g., "FF" based on the hexadecimal notation is written to the SWF area 4 when the user data is written to the data portion 3. The CCW corresponding optical disk apparatus, when recording user data in the data portion 3, to begin with, reads data of the data portion 3 to be recorded, and determines that data has already been recorded if "FF" is written to the SWF area 4 but determines the area as a non-recorded area in cases other than the above case. Then, when determining that the area has already been recorded with data, the recording process is suspended. When the area is determined as a non-recorded area, user data is recorded after erasing the data in the data portion 3.

In the thus constructed CCW corresponding disk apparatus, the data overwrite is prevented based on judging whether or not the data has already been written, which involves (the first method) recording the specified pattern in the flag area just anterior to the data portion of each sector, or (the second method) recording the specified data in the SWF area of each data portion to which the data is written.

There arise, however, problems inherent in those methods, wherein if the specified pattern can not be detected or if the specified data can not be read from the SWF area due to a medium defect in the flag area or in the SWF area, it must be misjudged that user data is not written to the data portion, and important data is to be deleted by overwriting.

Further, the first method entails a recording circuit for the flag area and a circuit for detecting the specified pattern from the flag area.

Moreover, the second method requires a circuit for recognizing that "FF" is written in the SWF area.

That is, the prior art CCW corresponding optical disk apparatus additionally needs a circuit for recording the pattern indicating that the sector has already been recorded with data, and a circuit for determining whether or not data has already been recorded in the data portion of the sector. This results in a larger size of circuit than in a CCW non-corresponding optical disk apparatus.

Next, FIG. 2 shows another internal configuration of the sector on the recording medium. Referring to FIG. 2, an address of this sector is recorded in an ID area (an address area) 11, while data available for the user is recorded in a data portion 13. A piece of information indicating whether or not data has already been written in the sector, is recorded in a flag area 12 just anterior to the data portion 13. Then, according to the first method in the configuration shown in FIG. 2, the information in this flag area 12 is read when recording user data, and it is judged that data is unwritable if the specified pattern is written, whereby recording of user data is suspended.

Next, according to the second method in the configuration illustrated in FIG. 2, the judgement is made by recording the specified pattern such as "FF" based on the hexadecimal notation in an SWF area 14 serving as a part of the data portion that is normally unused.

More specifically, the SWF data is recorded together with user data. Then, an ECC code is added to the user data and to the SWF data, and then recorded in an ECC area 15. Herein, when recording data, to begin with, all items of data including the SWF data in the data portion 13 to be recorded, are read and demodulated, and the SWF data is determined from the data after an error has been corrected. Then, if "FF" is written as the SWF data at this time, it is judged that the data portion 13 is determined as a data-recorded area, and no data is recorded therein. Further, if data exclusive of "FF" is recorded, the area is determined to be a non-recorded area, thereby permitting the recording of data.

Thus, according to the earlier technology, the apparatus is employed as the unrewritable optical disk apparatus in such a manner that the flag is recorded in the head of each sector when recording data (the first method); and the specified pattern is recorded and temporarily regenerated when recording, and whether or not data has already been recorded is determined by detecting whether the specified pattern is recorded or not (the second method).

The first method, however, presents a problem in which there might be a possibility of mis-recognizing the flag due to a defect in the recording medium, and, if mis-recognized, important data is deleted.

Further, the second method has such a problem that all the data in the data areas have to be temporarily read when recording, and hence it takes much time to check whether data are recorded or not, with the result that data can not be promptly recorded.

SUMMARY OF THE INVENTION

Accordingly, it is a primary object of the present invention to prevent data from being overwritten by accurately judging whether or not data has already been recorded in a CCW corresponding optical disk apparatus.

To accomplish this object, according to one aspect of the present invention, an optical disk apparatus comprises a detection circuit for detecting resynchro patterns recorded together with user data from regenerative signals obtained from a data portion of a sector before recording user data in the sector on an optical disk, a counting circuit for counting the number of detected resynchro patterns, and an overwrite preventive circuit for stopping recording of data in the sector if a count value of the counting circuit is a predetermined value or larger. Hence, when recording user data, the number of resynchro patterns detected from the data portion is counted, and if the count value is not less than the predetermined value, the record of the user data in the sector is stopped. It is therefore feasible to prevent the data overwrite by precisely detecting whether or not data has already been recorded in the sector.

Furthermore, the data portion is provided with a resynchro pattern recording area, and the resynchro pattern is recorded in the resynchro pattern recording area as one-pattern data per several bytes of the user data recorded in the data portion. As a result, even if a medium defect exists in the data portion of the sector, and when data has already been recorded in that sector, it is possible to accurately detect that data has already been recorded therein.

It is another object of the present invention to prevent the data overwrite on an optical disk without adding a new circuit in a CCW corresponding optical disk apparatus.

To accomplish this object, according to another aspect of the present invention, an optical disk apparatus comprises a detection circuit for detecting synchro patterns recorded together with user data from regenerative signals obtained from a data portion of a section before recording the user data in the sector, and an overwrite preventive circuit for stopping recording of data in the sector when the detection circuit detects the synchro patterns. Accordingly, when detecting the synchro patterns from the data portion of the relevant sector, data is not recorded in the relevant sector.

Further, an optical disk apparatus comprises a first detection circuit for detecting synchro patterns recorded together with user data from regenerative signals obtained from a data portion of a sector before recording user data in the sector, a second detection circuit for detecting resynchro patterns recorded together with user data from the regenerative signals obtained from the data portion of the sector before recording user data in the sector, and an overwrite preventive circuit for stopping recording of data in the sector on the basis of a detection output of one of the first and second detection circuits. Hence, when one of the synchro pattern and the resynchro pattern is detected from within the data portion of the relevant sector, data is not recorded in the relevant sector.

Further, the second detection circuit detects the resynchro pattern if the first detection circuit does not detect the synchro pattern.

Moreover, the second detection circuit detects a specified number N (N is an integer not less than 1) of resynchro patterns of the data portion.

It is still another object of the present invention to provide a CCW corresponding optical disk apparatus capable of preventing data overwrite by accurately determining whether a target sector is in a recorded status or in a non-recorded status.

To accomplish the above object, according to a further aspect of the present invention, an optical disk apparatus comprises a data regenerating circuit for regenerating data from regenerative signals obtained from the data portion of the sector before recording data in the sector, an error correcting circuit for correcting an error in the data regenerated by the data regenerating circuit and, when possible of correcting the error, generating an error correction OK signal, and an overwrite preventive circuit for stopping recording of data in the sector when receiving the error correction OK signal from the error correction circuit. According to the present invention, before recording data in the target sector, data is regenerated from the regenerative signal obtained from the data portion of the target sector, and the error in the regenerated data is corrected. At this time, if possible of correcting the error, i.e., if the error falls within a correctable range including the case with no error, it is judged that the data has already been recorded in the target sector, thereby stopping recording (overwrite) of data in the target sector.

According to a still further aspect of the present invention, an optical disk apparatus comprises a data regenerating circuit for regenerating user data and an error correction code from regenerative signals obtained from the data portion of the sector before recording data in the sector, an error correcting circuit for correcting an error in user data on the basis of the error correction code regenerated by the data regenerating circuit and, if possible of correcting the error, generating an error correction OK signal, and an overwrite preventive circuit for stopping recording of data in the sector upon receiving an error correction OK signal from the error correction circuit. According to the present invention, before recording data in the target sector, user data and the error correction code are regenerated from the regenerative signals obtained from the data portion of the target sector, and the error in user data is corrected based on the regenerated error correction code. At this time, if possible of correcting the error, viz., if the error falls within the correctable range including the case with no error, it is judged that data has already been recorded in the target sector, and the recording (overwrite) of data in the target sector is stopped.

It is a further object of the present invention to promptly determine whether data is recorded or not as well as accurately judging whether data has already been recorded even if there is a medium defect.

To accomplish the above object, there is provided a specified pattern detection circuit for detecting a specified pattern indicating that data has already been recorded on a recording medium. Accordingly, the specified pattern detection circuit detects the specified pattern existing in the normally recorded data. As a result, a special recording area for recording the recorded information on the recording medium, is unnecessary. Further, the specified pattern detection circuit is capable of detecting the specified pattern from data immediately after being regenerated, and it is therefore feasible to determine a recorded status without reading all the data in one sector. Hence, whether data is recorded or not is promptly judged.

Furthermore, the specified pattern detection circuit detects a continuation of the specified patterns existing in signals regenerated and inputted, and gives forth a data-recorded output when the number of continuations of the specified pattern comes to a predetermined number. Accordingly, even if a defect is seen partly on the medium, the specified pattern can be detected without any misreading. In consequence of this, data is prevented from being overwritten to the sector because of misjudging the sector as a non-recorded sector. Accordingly, accuracy of protecting the record is enhanced.

Further, a plurality of beams are provided, the data regenerating circuit regenerates the data by use of a leading beam of these beams, and the data recording circuit records the data by use of a trailing beam. When the number of continuations of the specified patterns comes to a predetermined number during the regeneration of data, data is inhibited from being recorded. Consequently, the leading beam is capable of checking the recorded status of the recording medium. It is therefore feasible to promptly record data without coming into standby status for the rotations of the recording medium when recording data and also prevent recorded data damage when recorded with data.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

The present invention will hereinafter be described with reference to the accompanying drawings.

Figure 1:
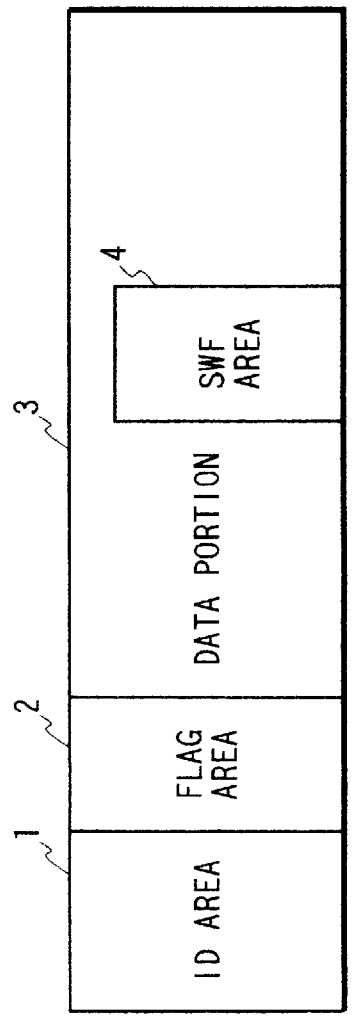
FIG. 1 is a diagram illustrating a configuration of a sector on an optical disk in earlier technology.
Figure 2:
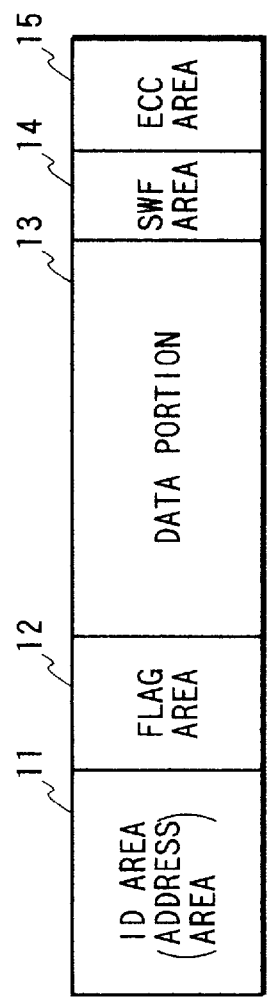
FIG. 2 is a diagram showing another configuration of the sector on the optical disk in earlier technology.
Figure 3:
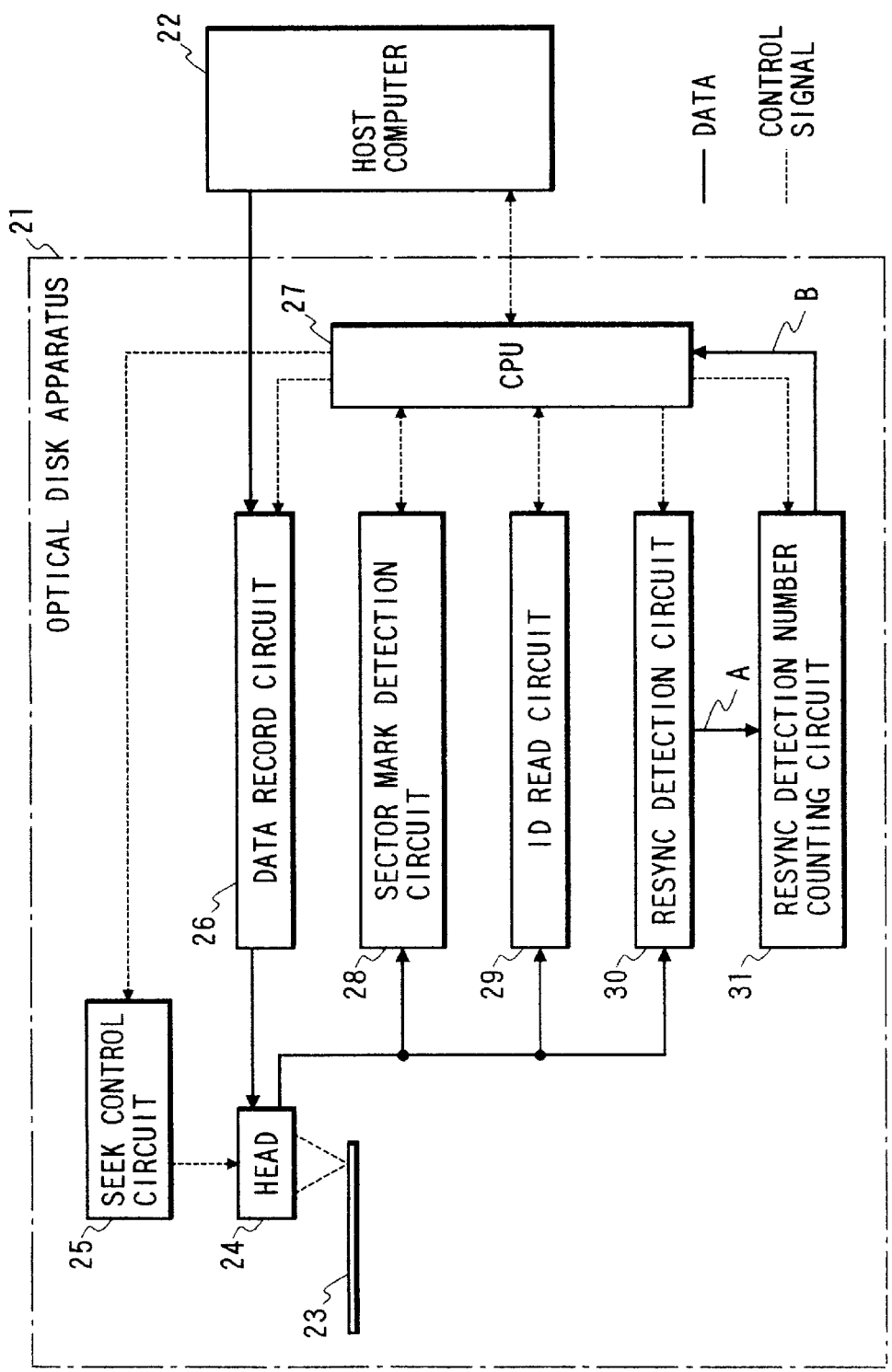
FIG. 3 is a block diagram illustrating a construction of an optical disk apparatus according to the present invention.

FIG. 3 is a block diagram illustrating a construction of an optical disk apparatus according to the present invention. An optical disk apparatus 21 is normally connected to a host computer 22. The host computer 22 employs the optical disk apparatus 21 as an external storage apparatus, and transmits information that should be recorded to the optical disk apparatus 21 or reversely receives the information read by the optical disk apparatus 21.

The optical disk apparatus 21 comprises, as shown in FIG. 3, an optical disk 23 defined as a recording medium, a head 24, a seek control circuit 25, a data recording circuit 26, a CPU 27, a sector mark detection circuit 28, an ID read circuit 29, a RESYNC detection circuit 30, and a RESYNC detection number counting circuit 31.

Figure 4:
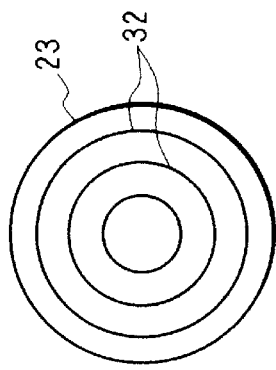
FIG. 4 is a diagram illustrating a configuration of an optical disk in the above optical disk apparatus.
Figure 5:
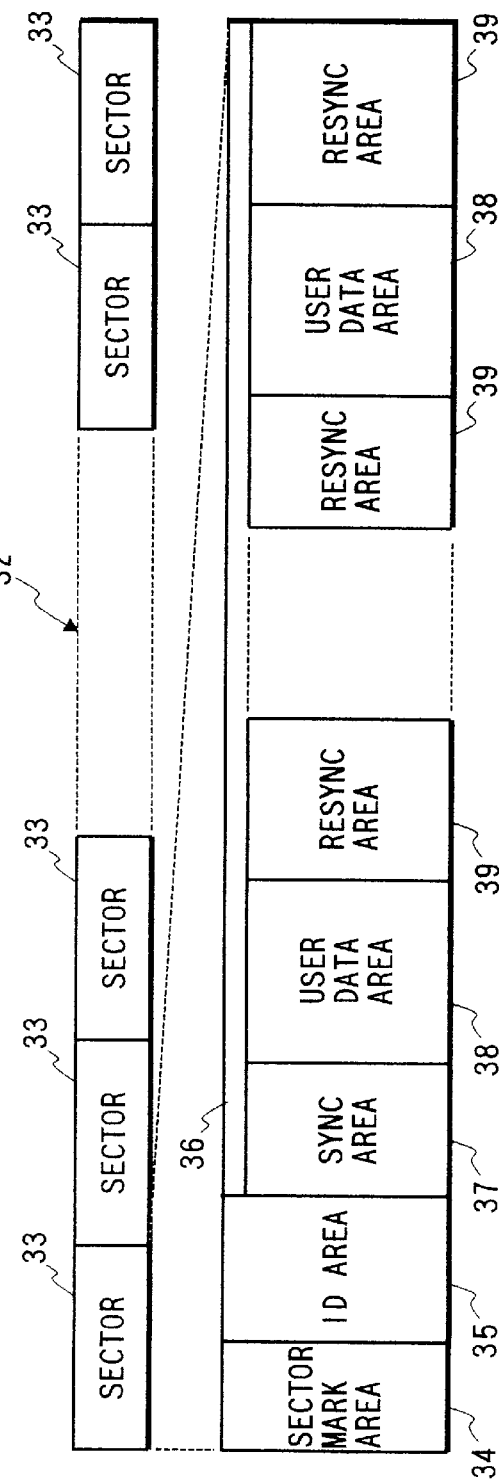
FIG. 5 is a diagram showing a configuration of a sector on an optical disk of the present invention.

Further, FIG. 4 is a diagram illustrating a construction of the above-mentioned optical disk 23. The optical disk 23 is formed with a plurality of tracks 32 formed spirally or in a concentric circular shape. Each track 32 is, as shown in FIG. 5, segmented into a plurality of sectors 33.

Herein, the sector 33 consists of a sector mark area 34 indicating a sector head position, an ID area 35 recorded with a sector address, and a data portion 36 recorded with user data. Further, the data portion 36 includes a SYNC area 37 recorded with a SYNC signal indicating a head position of the data portion, i.e., recorded with a synchro pattern signal, a user data area 38, and a RESYNC area 39 provided at an intervals of several bytes of the user data to be recorded, and recorded with a RESYNC signal used for synchronization when regenerating the data, i.e., recorded with a resynchro pattern signal. These respective areas are in non-recorded status in the initial status but recorded with data when data is written.

Next, operation of the thus constructed optical disk apparatus 21 will be explained.

When the optical disk apparatus 21 receives a write instruction from the host computer 22, the CPU 27 transmits a seek instruction to the seek control circuit 25. With the transmission of this seek instruction, the seek control circuit 25 moves the head 24 to a track to which a target sector belongs.

The head 24 moves to the target sector, a regenerative signal on the optical disk 23 that is obtained by the head 24 is transmitted to the sector mark detection circuit 28, and the sector mark detection circuit 28 recognizes a head position of each sector. Then, with this serving as a trigger, the ID read circuit 29 reads an ID of the ID area 35. The ID readout operation thus performed is repeated, thereby having access to the target sector. When the head 24 reaches the target sector, the RESYNC detection circuit 30 detects a resynchro pattern in the RESYNC area 39 from the regenerative signal of the data portion 36 of that target sector.

The following are methods of detecting the resynchro pattern signal by the RESYNC detection circuit 30.

To be specific, a first method is a method of always detecting the resynchro pattern in all the areas of the data portion 36. Then, a second method is a method of detecting the resynchro pattern only at a point of time when the detection of the resynchro pattern might be expected and only in the vicinity of this point of time. That is, according to this method, a timer is actuated with a trigger just before the detection of the sector mark area 34, the SYNC area 37 and the RESYNC area 39, and the detecting operation is enabled only at each detection point.

The RESYNC detection circuit 30, upon detecting the resynchro pattern signal during the above detecting operation, outputs this signal as a detection pattern signal A. The RESYNC detection number counting circuit 31 inputs and counts the detection pattern signals A. That is, one pattern is recorded per several bytes of user data when recording user data. The RESYNC detection number counting circuit 31 then inputs the detection pattern signals A and counts these signals A pattern by pattern. Subsequently, if this count value is not less than a predetermined number N, the RESYNC detection number counting circuit 31 outputs a data-written signal B to the CPU 27. The CPU 27 receives this data-written signal B and thereby determines that user data has been already written to the target sector. Then, the CPU 27 transmits a message of an overwrite error to the host computer 22 and suspends a write instruction.

On the other hand, if the RESYNC detection number counting circuit 31 does not output the data-written signal B, the CPU 27 moves the head 24 again to the target sector by use of the seek control circuit 25, the sector mark detection circuit 28 and the ID read circuit 29, and records the user data transferred from the host computer 22 in the user data area 38 of the data portion 36 by controlling the data recording circuit 26. Note that the CPU 27 in advance of recording this user data records the synchro pattern in the SYNC area 37 and also the above-mentioned resynchro pattern in the RESYNC area 39.

Thus, this optical disk apparatus 21 detects the resynchro patterns recorded in the RESYNC area 39 of the data portion 36 and inserted at the interval of several bytes of user data before recording user data in the target sector, and recognizes that the relevant target sector has already been recorded with data if the number of patterns thereof is not less than the predetermined value N. Then, the optical disk apparatus 21 prevents the overwrite of data by suspending the data write.

As a result, even if a medium defect occurs in the data portion 36, this defect never leads to damage to the entire data portion, and, at the most, resynchro patterns on the order of 2 or 3 might be undetectable. Hence, if the predetermined value N is set to an adequate value, such as "5", that is a total number of the resynchro patterns in the data portion 36, it is feasible to surely detect whether the area of the data portion 36 is in a recorded or unrecorded status (recorded with absolutely no resynchro patterns because of a delete status). Accordingly, unlike an overwrite preventive method as practiced in the earlier technology, the invention assuredly avoids a situation in which important data are deleted by overwriting due to a misjudgment that the data portion area is in the unrecorded status because of a medium defect.

Note that the optical disk apparatus 21 in accordance with this embodiment incorporates only a data additional writing function but is, as a matter of course, usable as a WORM (Write-Once-Read-Many) apparatus capable of writing once and reading many times as the necessity arises by adding a data regeneration circuit thereto.

Further, validity and invalidity of the above overwrite preventive function are switched over based on switchover signals given from an outside switch and the host computer 22 and on WORM/MO identifying information on the recording medium, thus enabling the optical disk apparatus 21 to be used as the above-described WORM apparatus and also an MO (Magnet Optical-Writer) apparatus capable of writing at any time.

As discussed above, according to the present invention, when recording user data, the number of resynchro patterns detected from the data portion is counted, and, if this count value exceeds the predetermined value, the recording of user data in the sector is stopped. Hence, it is feasible to accurately detect whether data has been already recorded on the optical disk and to prevent data from being overwritten.

Further, the data portion is provided with the resynchro pattern recording area recorded with the resynchro pattern by way of one-pattern data per several bytes of user data recorded in the data portion. Therefore, even if the optical disk has a medium defect, and when data has been already recorded on the optical disk, it is possible to exactly detect whether data has been already recorded by properly selecting the predetermined value.

Another embodiment of the present invention will be described with reference to FIG. 6.

Figure 6:
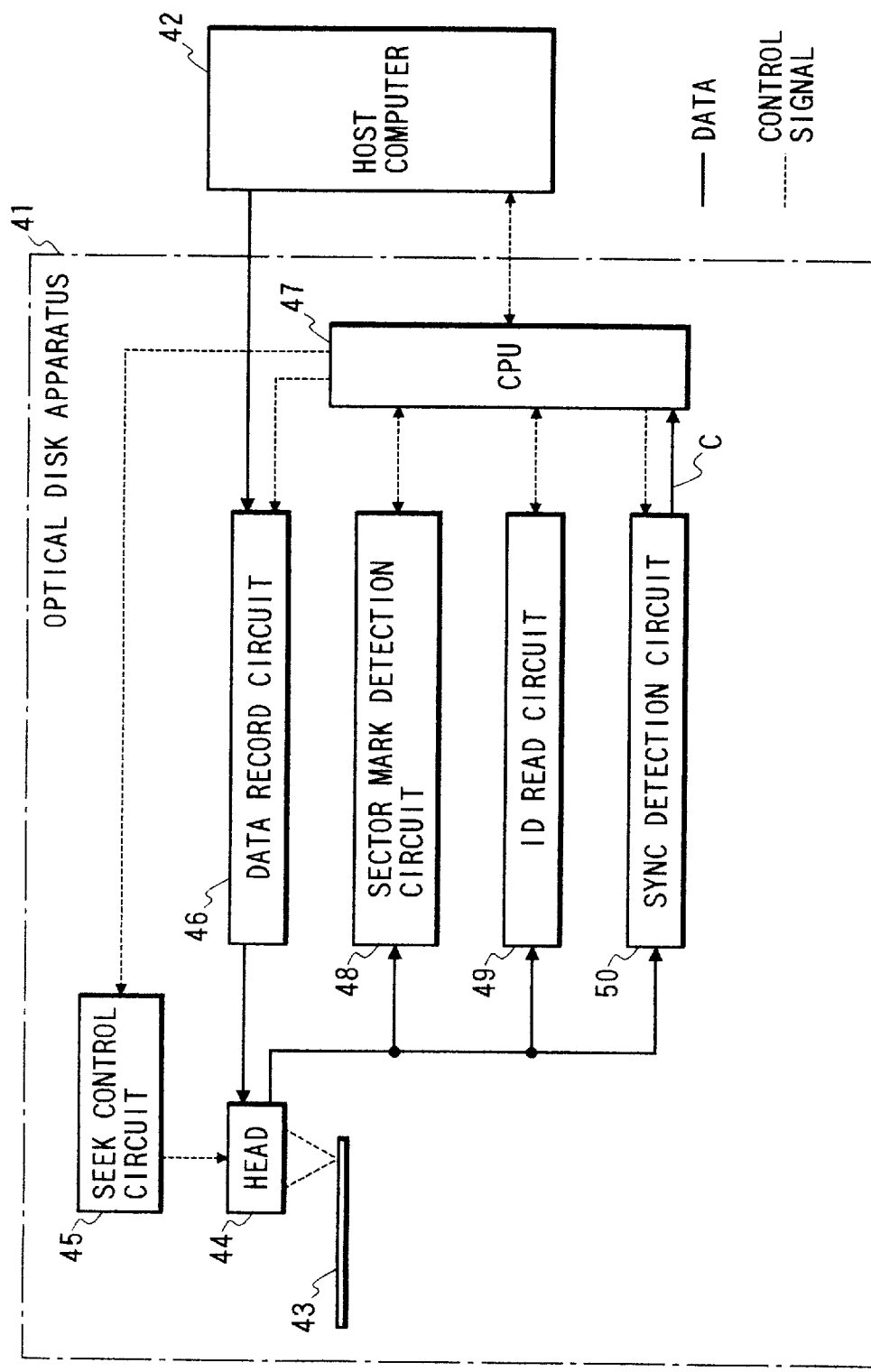
FIG. 6 is a block diagram illustrating a construction of the optical disk apparatus in another embodiment of the present invention.

FIG. 6 is a block diagram showing a construction of the optical disk apparatus of the present invention. An optical disk apparatus 41 is normally connected to a host computer 42.

The optical disk apparatus 41 is, as shown in FIG. 6, constructed of an optical disk 43 defined as a recording medium, a head 44, a seek control circuit 45, a data recording circuit 46, a CPU 47, a sector mark detection circuit 48, an ID read circuit 49, and a SYNC detection circuit 50.

Figure 7:
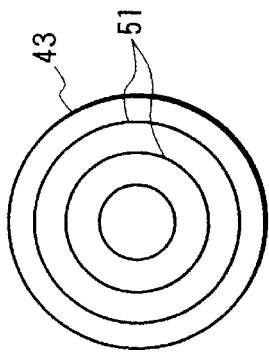
FIG. 7 is a diagram showing a configuration of the optical disk in the above optical disk apparatus.
Figure 8:
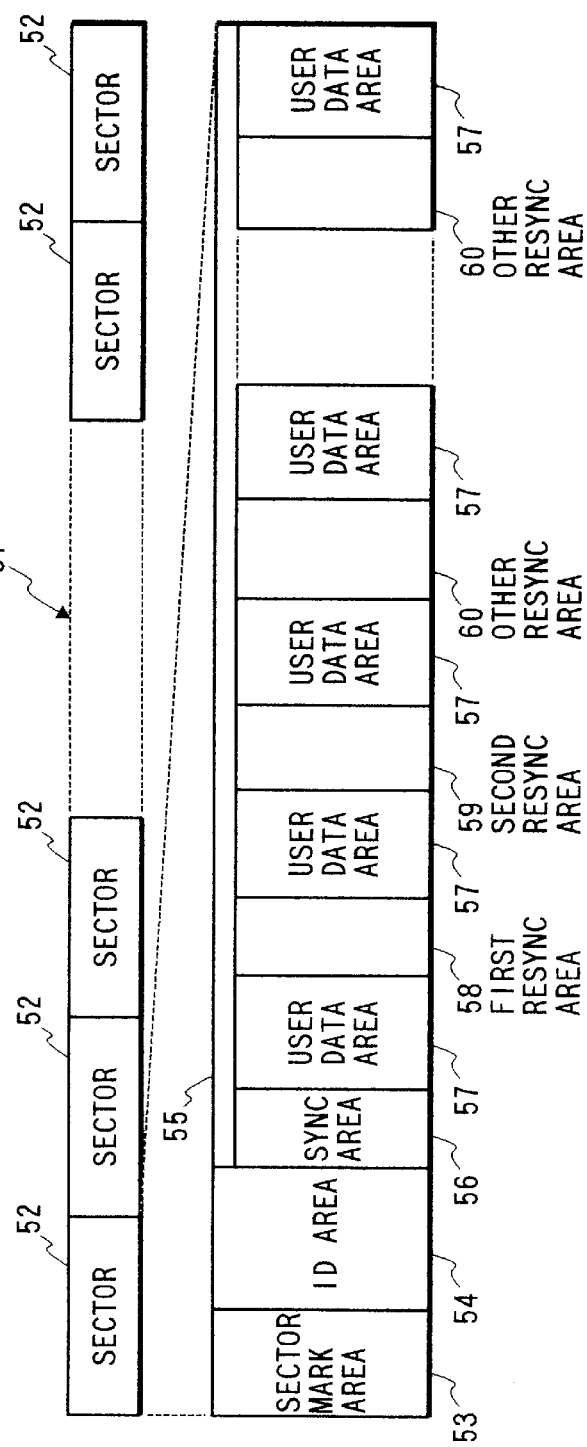
FIG. 8 is a diagram showing a configuration of the sector on the optical disk.

Further, FIG. 7 is a diagram illustrating a construction of the above-mentioned optical disk 43. The optical disk 43 is formed with a plurality of tracks 51 formed spirally or in a concentric circular shape as illustrated in FIG. 7. Each track 51 is, as shown in FIG. 8, segmented into a plurality of sectors 52.

Herein, the sector 52 consists of a sector mark area 53 indicating a sector head position, an ID area 54 recorded with a sector address, and a data portion 55 recorded with user data. Further, the data portion 55 includes a SYNC area 56 used for detecting a head position of the data portion 55, a user data area 57, a first RESYNC area 58 provided at an interval of several bytes of user data to be recorded and used for data re-synchronization, a second RESYNC area 59 and other RESYNC area 60. These respective areas are in non-recorded status in the initial status but each recorded with data when data is written.

Next, operation of the thus constructed optical disk apparatus 41 will be explained.

When the optical disk apparatus 41 receives a write instruction from the host computer 42, the CPU 47 transmits a seek instruction to the seek control circuit 45. With the transmission of this seek instruction, the seek control circuit 45 moves the head 44 to a track to which a target sector belongs.

The head 44 moves to the target sector, a regenerative signal on the optical disk 43 that is obtained by the head 44 is transmitted to the sector mark detection circuit 48, and the sector mark detection circuit 48 detects the data of the sector mark area 53 and thus recognizes a head position of each sector. Then, with this serving as a trigger, the ID read circuit 49 reads an ID of the ID area 54. The ID readout operation thus performed is repeated, thereby providing access to the target sector. When the head 44 reaches the target sector, the SYNC detection circuit 50 detects a synchro pattern in the SYNC area 56 from the regenerative signal of the data portion 55 of that target sector.

Then, the SYNC detection circuit 50, upon detecting the synchro pattern, outputs this as a synchro detection signal C to the CPU 47. The CPU 47 receives this synchro detection signal C and thereby determines that user data has been already written to the target sector. Then, the CPU 47 transmits a message of an overwrite error to the host computer 42 and suspends a write instruction.

On the other hand, if the SYNC detection circuit 50 does not output the synchro detection signal C, the CPU 47 moves the head 44 again to the target sector by use of the seek control circuit 45, the sector mark detection circuit 48 and the ID read circuit 49, and records user data transferred from the host computer 42 in the user data area 57 of the data portion 55 by controlling the data recording circuit 46. Note that the CPU 47 in the case of recording user data records the respective synchro patterns in the SYNC area 56, the first RESYNC area 58, the second RESYNC area 59 and other RESYNC area 60, and thereafter records the user data.

Figure 9:
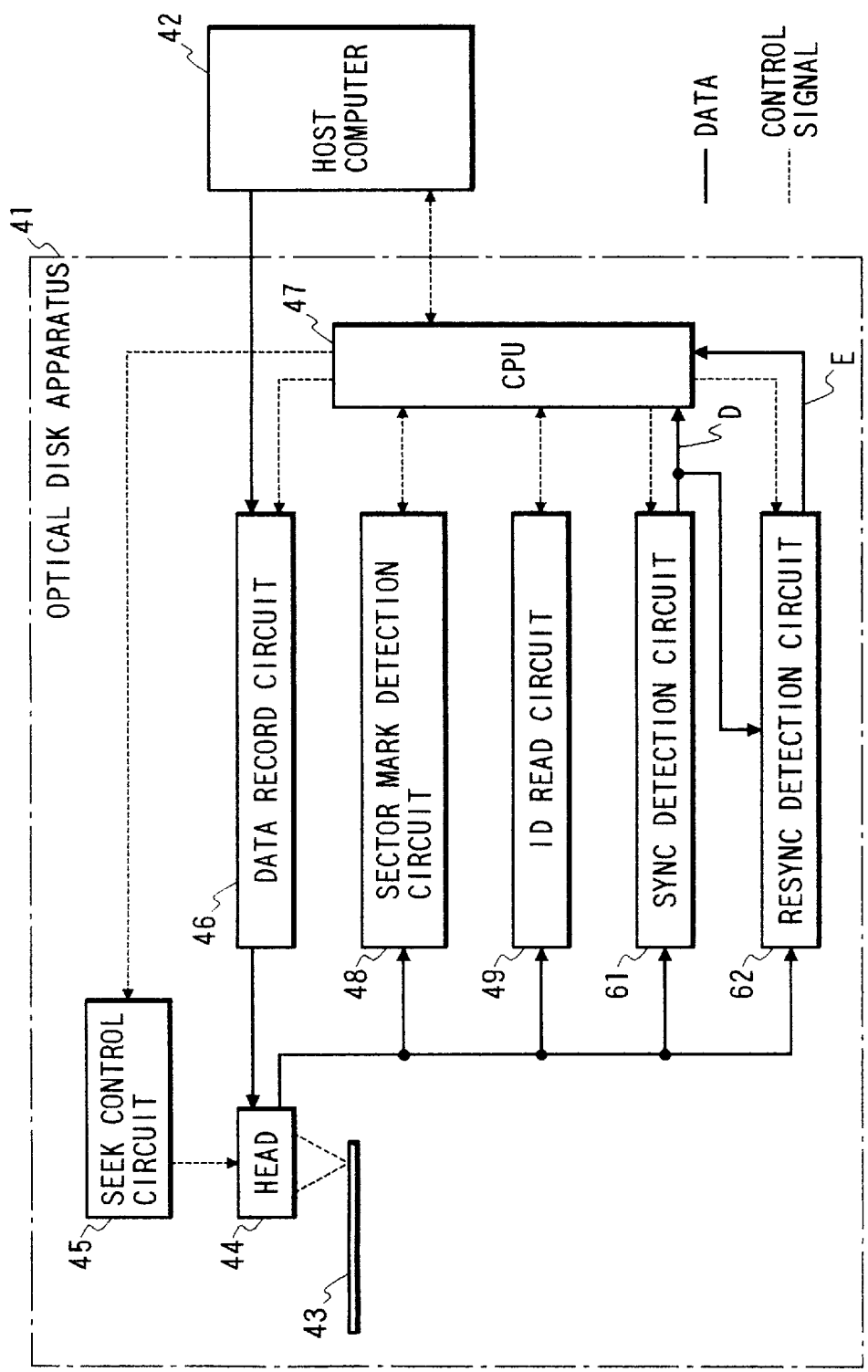
FIG. 9 is a block diagram illustrating still another embodiment of the optical disk apparatus.

Next, FIG. 9 is a block diagram illustrating still another embodiment of the present invention. Referring herein to FIG. 9, the same portions as those in FIG. 6 are marked with the same numerals, and an explanation thereof is omitted. In accordance with this embodiment, instead of the SYNC detection circuit 50 shown in FIG. 6, the SYNC detection circuit 61 and the RESYNC detection circuit 62 are provided.

Next, operation of the apparatus illustrated in FIG. 9 will be explained.

The write instruction is received from the host computer 42, and the head 44 thereby reaches the target sector. Thereupon, the SYNC detection circuit 61 detects the synchro pattern in the SYNC area 56 from the regenerative signal of the data portion 55 of that target sector.

Then, the SYNC detection circuit 61 detects the synchro pattern, and a synchro detection signal D is outputted to the CPU 47. Further, if the SYNC detection circuit 61 is unable to detect the synchro pattern, the RESYNC detection circuit 62 detects the resynchro pattern of each of the first RESYNC area 58 and the second RESYNC area 59 from the regenerative signal transmitted from that data portion 55. Herein, if the resynchro pattern is detected from each area, a RESYNC detection signal (i.e., a resynchro detection signal) E is outputted to the CPU 47.

The CPU 47, upon receiving the synchro detection signal D from the SYNC detection circuit 61 or the resynchro detection signal E from the RESYNC detection circuit 62, determines that user data has been already written to the target sector, and transmits a message of the overwrite error to the host computer 42, thereby suspending the write instruction.

On the other hand, if neither the SYNC detection circuit 61 nor the RESYNC detection circuit 62 outputs the synchro detection signal D or the resynchro detection signal E, the CPU 47 moves the head 44 again to the target sector by use of the seek control circuit 45, the sector mark detection circuit 48 and the ID read circuit 49, and records the user data transferred from the host computer 42 in the user data area 57 of the data portion 55 by controlling the data recording circuit 46.

Note that the RESYNC detection circuit 62 detects the data of each of the first RESYNC area 58 and the second RESYNC area 59 in this embodiment; however, the data detection is not limited to this. Actualization thereof might be attained by detection of N-pieces (1<N< "total number (integer number) of data within the first RESYNC area 58") of resynchro data existing in specific positions of the data portion 55.

Thus, whether or not data has been already written to the data portion of the sector is determined by employing the SYNC detection circuit and the RESYNC detection circuit that are availed for regenerating the data, and then data overwrite is prevented. Accordingly, there is no necessity for newly providing a circuit for determining whether or not data has already been written to the data portion of each sector, and it is feasible to construct the apparatus with the same size of circuit as that in the CCW non-corresponding optical disk apparatus.

Moreover, according to the earlier technological overwrite preventive method, if a medium defect can be seen in a flag or an SWF area, or if the specific pattern is undetectable from the flag (a first method), or if the specific data can not be read from the SWF area (a second method), a misjudgment occurs indicating that no user data is written to the data portion, and also a possibility exists that important data is deleted by overwriting. Also, if a medium defect occurs in the data portion, however, all the SYNC area 56, the first RESYNC area 58 and the second RESYNC area 59 are not brought into an undetectable status at all. In the present invention, it is possible to avoid a situation in which important data is deleted, by checking each of the above-described areas.

Note that the optical disk apparatus 41 in accordance with this embodiment incorporates only the data additional writing function but is, as a matter of course, usable as the WORM (Write-Once-Read-Many) apparatus capable of writing once and reading many times as the necessity arises by adding the data regeneration circuit thereto.

Further, the validity and the invalidity of the above overwrite preventive function are switched over based on switchover signals given from an outside switch and the host computer 42 and on the WORM/MO identifying information on the recording medium, thus enabling the optical disk apparatus 41 to be used as the above-described WORM apparatus and also MO (Magneto Optical-Writer) apparatus capable of writing at any time.

As discussed above, according to the present invention, the SYNC detection circuit (a detecting unit) employed when regenerating data detects the synchro pattern from within the regenerative signals obtained from the data portion of the sector before recording user data in the sector. When the synchro pattern is detected, no data is recorded on the relevant sector, and hence data overwriting can be prevented by accurately detecting whether or not data has already been written to the data portion of each sector without newly providing a circuit.

Further, the synchro pattern and the resynchro patterns are detected from within the data portions of the relevant sectors by the SYNC detection circuit (a first detecting unit) and the RESYNC detection circuit (a second detecting unit) that are used for regenerating the data. When one of the synchro pattern and the resynchro pattern is detected, no data is recorded on the relevant sector, and similarly it is therefore feasible to precisely detect whether or not data has already been written to the data portion of the sector without newly adding a circuit.

Still another embodiment of the present invention will be discussed with reference to FIG. 10.

Figure 10:
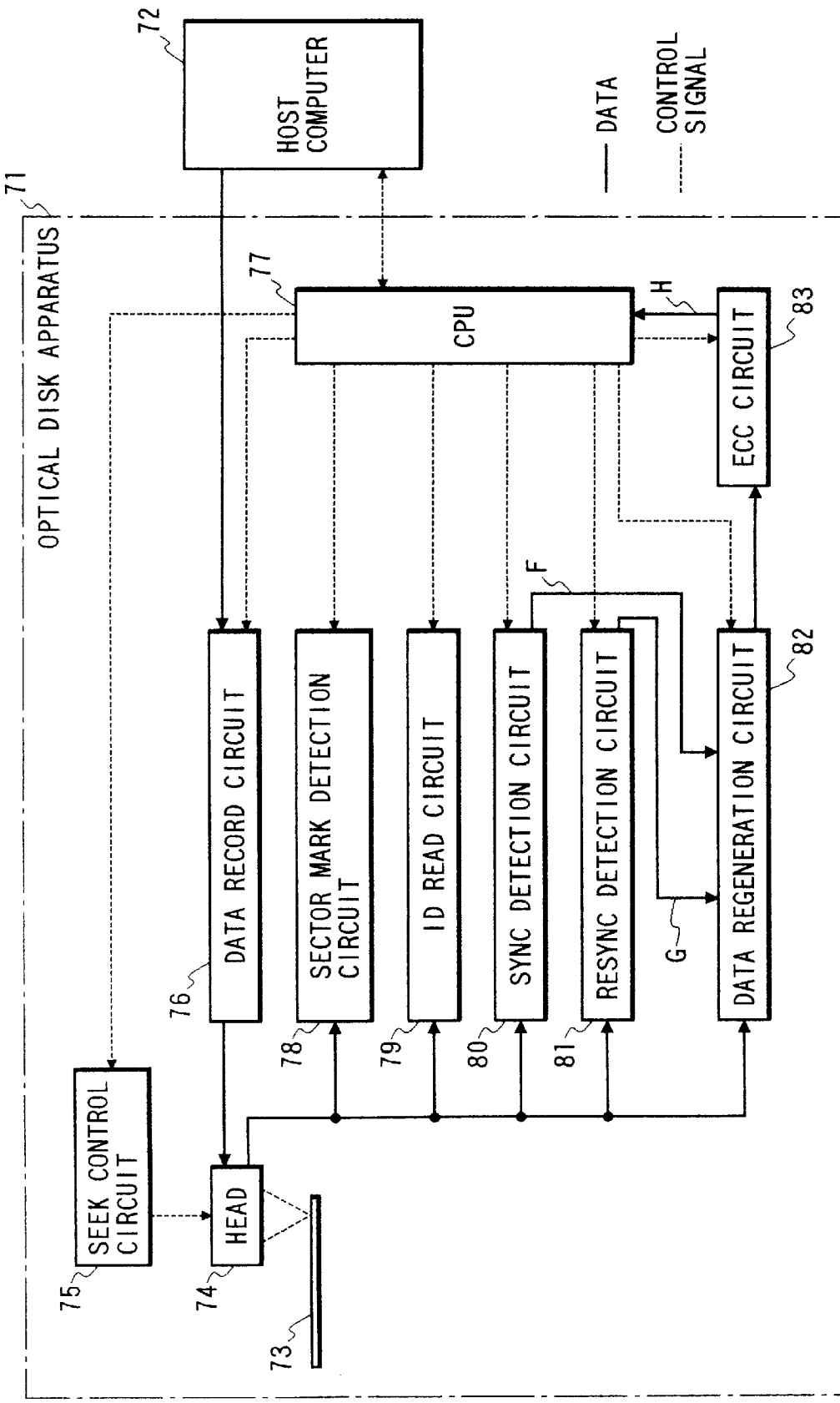
FIG. 10 is a block diagram illustrating a construction of the optical disk apparatus in a further embodiment of the present invention.

FIG. 10 is a block diagram showing a construction of the optical disk apparatus of the present invention. An optical disk apparatus 71 is normally connected to a host computer 72.

The optical disk apparatus 71 is, as shown in FIG. 10, constructed of an optical disk 73 defined as a recording medium, a head 74, a seek control circuit 75, a data recording circuit 76, a CPU 77, a sector mark detection circuit 78, and an ID read circuit 79, a SYNC detection circuit 80, a RESYNC detection circuit 81, a data regeneration circuit 82, and an error correction circuit (ECC circuit) 83.

Figure 11:
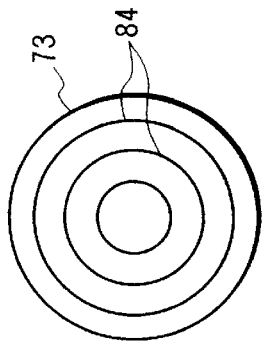
FIG. 11 is a diagram showing a configuration of the optical disk in this optical disk apparatus.
Figure 12:
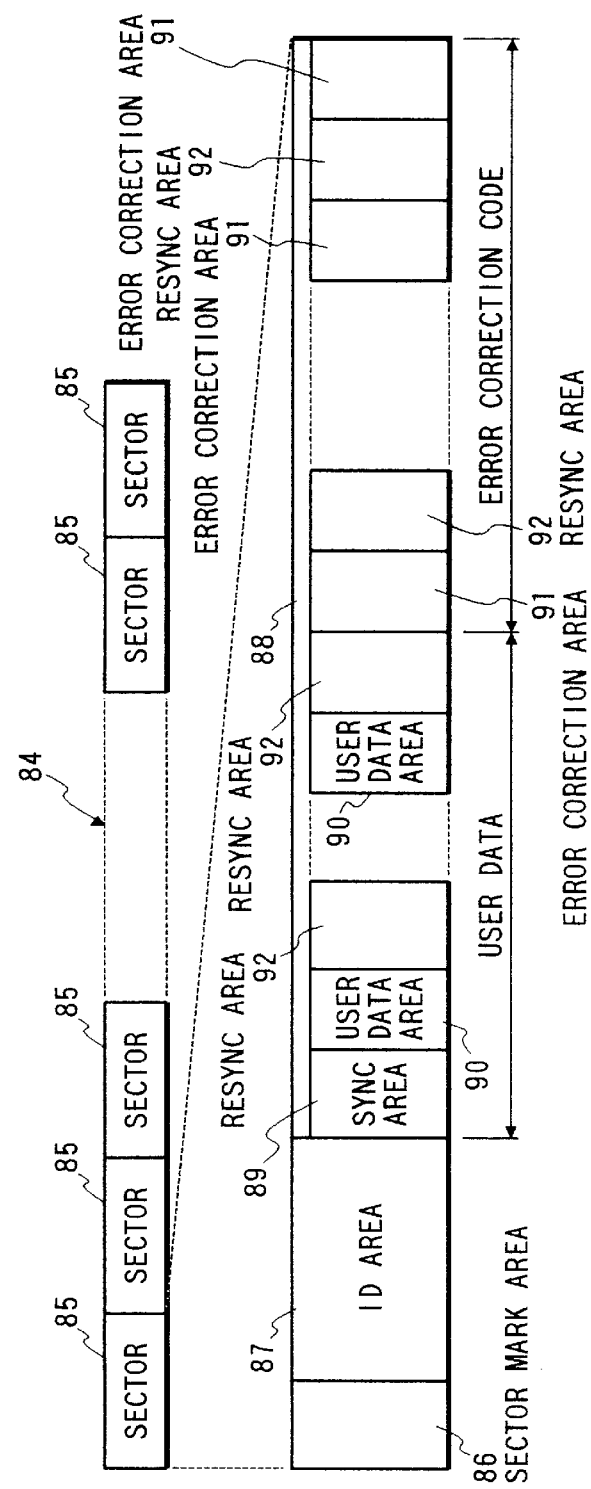
FIG. 12 is a diagram illustrating a configuration of the sector on the optical disk.

Further, FIG. 11 is a diagram illustrating a construction of the above-mentioned optical disk 73. The optical disk 73 is formed with a plurality of tracks 84 formed spirally or in a concentric circular shape as illustrated in FIG. 11. Each track 84 is, as shown in FIG. 12, segmented into a plurality of sectors 85.

Herein, the sector 85 consists of a sector mark area 86 indicating a sector head position, an ID area 87 recorded with a sector address, and a data portion 88 recorded with user data and an error correction code. Further, the data portion 88 includes a SYNC area 89 recorded with a SYNC signal indicating a head position of the data portion, i.e., a synchro pattern signal, a user data area 90, an error correction code area 91, and a RESYNC area 92 recorded with a RESYNC signal provided at an interval of several bytes of the user data to be recorded and the error correction code and then used when regenerating the data, i.e., a resynchro pattern signal. These respective areas are in non-recorded status in the initial status but each recorded with the data when data is written.

User data and the error correction code subsequent thereto are segmented and recorded based on a several-bytes segment unit, and the RESYNC signal is inserted in between the respective segments.

Next, operation of the thus constructed optical disk apparatus 71 will be explained.

When the optical disk apparatus 71 receives a write instruction from the host computer 72, the CPU 77 transmits a seek instruction to the seek control circuit 75. With the transmission of this seek instruction, the seek control circuit 75 moves the head 74 to a track to which a target sector belongs.

The head 74 moves to the target sector, a regenerative signal on the optical disk 73 that is obtained by the head 74 is transmitted to the sector mark detection circuit 78, and the sector mark detection circuit 78 recognizes the head position of each sector. Then, with this serving as a trigger, the ID read circuit 79 reads an ID of the ID area 87. The ID readout operation thus performed is repeated, thereby providing access to the target sector. When the head 74 reaches the target sector, the SYNC detection circuit 80 detects a synchro pattern in the SYNC area 89 from the regenerative signal of the data portion 88 of that target sector. The SYNC detection circuit 80, upon detecting the synchro pattern in the SYNC area 89, transmits a SYNC detection signal F to the data regeneration circuit 82. Further, the RESYNC detection circuit 81 detects the resynchro pattern in the RESYNC area 92 from the regenerative signal of the data portion 88 of that target sector. The RESYNC detection circuit 81, upon detecting the resynchro pattern in the RESYNC area 92, transmits a RESYNC detection signal G to the data regeneration circuit 82.

The data regeneration circuit 82 is capable of obtaining a start position of the user data and a piece of byte synchro information of the data from the SYNC detection signal F. Then, on the basis of these two items of information, the user data and the error correction code are read. On this occasion, the data regeneration circuit 82 is capable of obtaining a piece of resynchro information of the data from the RESYNC detection signal G. More specifically, if the synchro information of the data is lost in an arbitrary segment due to a bit slip, the data regeneration circuit 82 is incapable of correctly regenerating the data thereafter. If the synchro information is restored by the RESYNC detection signal G obtained from the RESYNC area 92 just posterior thereto, however, the data regeneration circuit 82 is capable of correctly regenerating the data in the segment subsequent to the RESYNC area 92 just posterior thereto.

The data regeneration circuit 82 transfers the user data and the error correction code to the error correction circuit 83. Based on the regenerated error correction code, the error correction circuit 83 corrects an error in the user data. If the data error contained in the user data and the error correction code is an error in such a range as to be correctable by the error correction circuit 83, the error correction circuit 83 transmits an error correction OK signal H to the CPU 77.

The error correction circuit 83 corrects the error in the user data on the basis of the error correction code regenerated by the data regeneration circuit 82, and, if the error is correctable (if within the error correctable range including a case with no error), transmits the error correction OK signal H to the CPU 77.

The CPU 77 receives the error correction OK signal H from the error correction circuit 83 and determines that the target sector has already been recorded with data (in the recorded status). Then, the CPU 77 transmits the message of the overwrite error to the host computer 72 to stop recording data in the target sector.

On the other hand, if the error correction circuit 83 does not output the error correction OK signal H, the CPU 77 determines that the target sector is in the non-recorded status, and moves the head 74 again to the target sector by use of the seek control circuit 75, the sector mark detection circuit 78 and the ID read circuit 79. Then, the CPU 77 records the user data transferred from the host computer 72 in the data portion 88 by controlling the data recording circuit 76 after adding the SYNC signal, the RESYNC signal and the error correction code.

Thus, in the optical disk apparatus 71, before recording user data in the target sector, the user data and the error correction code are regenerated from the data portion 88 of the target sector, and the error in the user data is corrected based on the thus regenerated error correction code. If the error is correctable, it is judged that the data has already been recorded in the target sector, and the data writing to the target sector is suspended. With this process, even if a medium defect is produced in a part of the data portion 88, the data overwrite is prevented by accurately determining whether or not the data has already been recorded.

The error correction circuit 83 is capable of normally correcting the error data of several-tens bytes. With this capability, even if a medium defect occurs in a part of the data portion 88, the user data can be restored. Namely, even if the medium defect can be seen in a part of the data portion 88, the error correction does not go into an NG status, and the error correction circuit 83 outputs the error correction OK signal H. Then, it is feasible to surely detect whether the data portion 88 is in the recorded or non-recorded status, depending on existence or non-existence of the error correction OK signal H. Accordingly, unlike the earlier technological overwrite preventive method, it is feasible to certainly avoid a misjudgment that the data portion area is in the non-recorded status,due to a partial medium defect and also to avoid a situation in which essential data are deleted by overwriting.

Next, a further embodiment of the present invention will be discussed.

Figure 13:
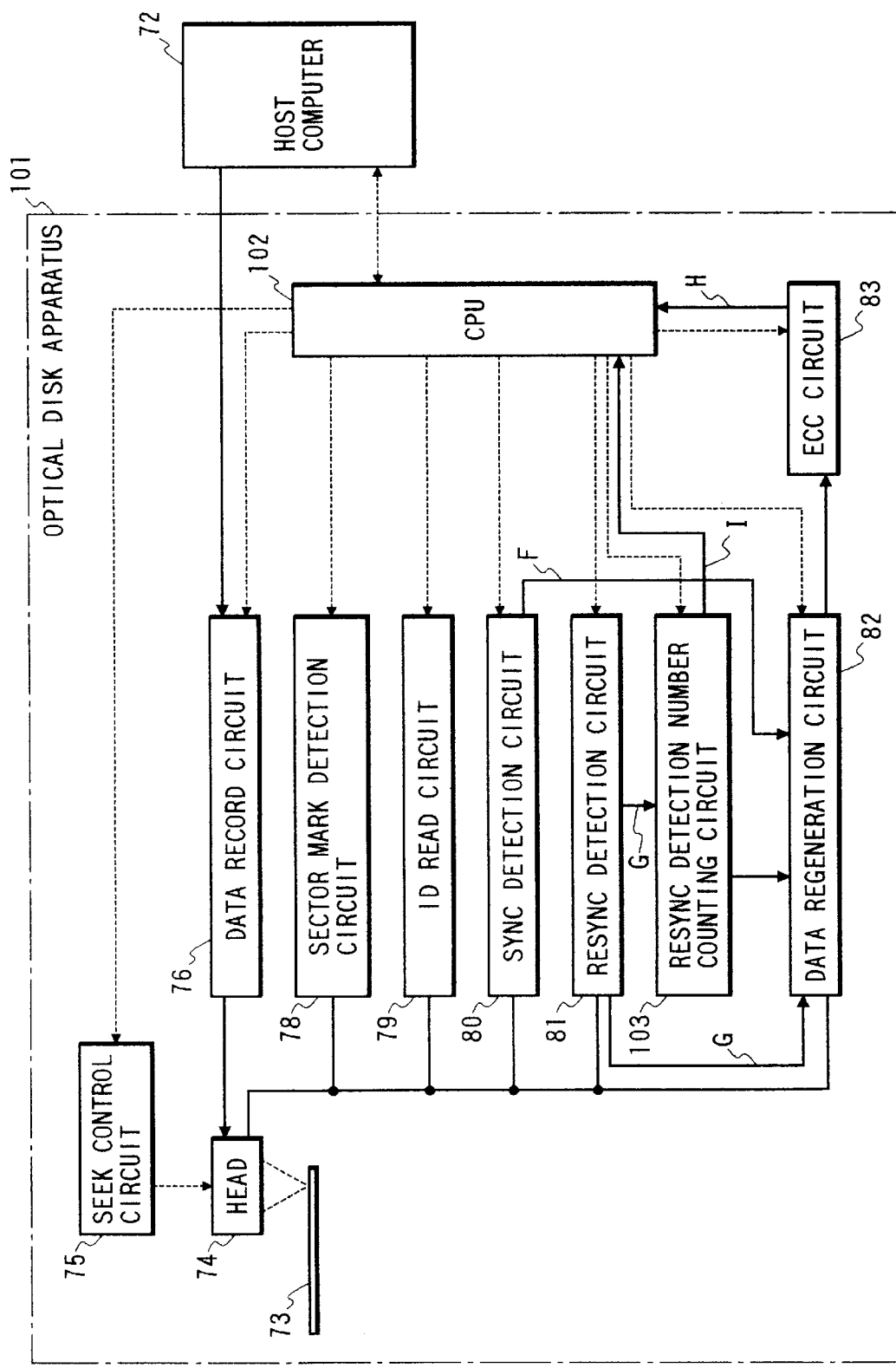
FIG. 13 is a block diagram illustrating a construction of the optical disk apparatus in a still further embodiment of the present invention.

FIG. 13 is a block diagram illustrating a construction of the optical disk apparatus in accordance with the further embodiment of the present invention. Referring to FIG. 13, the components marked with the same numerals as those in FIG. 10 are identical with those shown in FIG. 10. In accordance with this embodiment, the RESYNC detection signal G outputted from the RESYNC detection circuit 81 is outputted to the data regeneration circuit 82 and a RESYNC detection number counting circuit 103 as well.

The RESYNC detection number counting circuit 103 counts the number of times with which the RESYNC detection signal G is inputted (which number is the number of RESYNC detections). Then, a piece of count value data I is outputted to a CPU 102.

The CPU 102 inputs the count value data I from the RESYNC detection number counting circuit 103 and the error correction OK signal H from the error correction circuit 83. Then, the CPU 102, if the count value (the number of RESYNC detections) indicated by the count value data I is not less than a predetermined value, or alternatively if the error correction OK signal H is received, determines that data has already been recorded in the target sector. Then, the CPU 102 transmits the message of an overwrite error to the host computer 72 to stop recording data in the target sector.

On the other hand, if the count value (the number of RESYNC detections) indicated by the count value data I is smaller than the predetermined value, and, if the error correction OK signal 17 is not received, the CPU 102 determines that the target sector is in the non-recorded status. Then, as in the case of the apparatus in the embodiment shown in FIG. 10, data is recorded in the target sector.

The number of RESYNC detections may be counted by the RESYNC detection number counting circuit 103 before checking the error. Accordingly, in accordance with this embodiment, it can be determined from the count value of the number of RESYNC detections that data is not yet recorded in the target sector. This therefore makes it feasible to decrease a time needed for judging whether the target sector is in the non-recorded status or not, and resultantly a time necessary for the recording operation can be reduced.

Note that each of the optical disk apparatuses 71, 101 in accordance with the embodiments discussed above incorporates only the data additional writing function; however, the SYNC detection circuit 80, the RESYNC detection circuit 81, the data regeneration circuit 82 and the error correction circuit 83 that are used as units for determining the data-recorded sector are, as a matter of course, available as data reading units.

The optical disk apparatuses 71, 101 are each usable as a WORM (Write-Once-Read-Many) apparatus capable of writing once and reading many times as the necessity arises without adding the data reading circuit.

Further, the validity and the invalidity of the above overwrite preventive function are switched over based on switchover signals given from an outside switch and the host computer 72 and on the WORM/MO identifying information on the recording medium, thus enabling each of the optical disk apparatuses 71, 101 to be used as the above-described WORM apparatus and also the MO (Magneto Optical-Writer) apparatus capable of writing at any time.

As obvious from the discussion given above, according to the present invention, before recording data in a target sector, the data is regenerated from the regenerative signal obtained from the data portion of the target sector, and an error in the thus regenerated data is corrected. At this time, if the error is correctable, it is judged that data has already been recorded in the target sector, and data recording in the target sector is stopped. It is therefore feasible to accurately determine whether the target sector is in the recorded status or in the non-recorded status and to thereby prevent overwrite of the data.

Moreover, according to the present invention, the error correcting unit and the data regenerating unit provided to prevent overwrite, are available as the data reading unit. Hence, the optical disk apparatus can be employed as a WORM apparatus without adding a data reading circuit. In other words, according to the present invention, whether a target sector is in the recorded status or in the non-recorded status is determined by use of the error correcting unit and the data regenerating unit used for reading data, thus preventing an overwrite. Hence, there is no necessity for newly providing a circuit for determining whether a target sector is in the recorded status or in the non-recorded status, and it is feasible to construct the apparatus with the same size of circuit as that in the CCW non-corresponding optical disk apparatus.

A still further embodiment of the present invention will be discussed with reference to FIG. 14.

Figure 14:
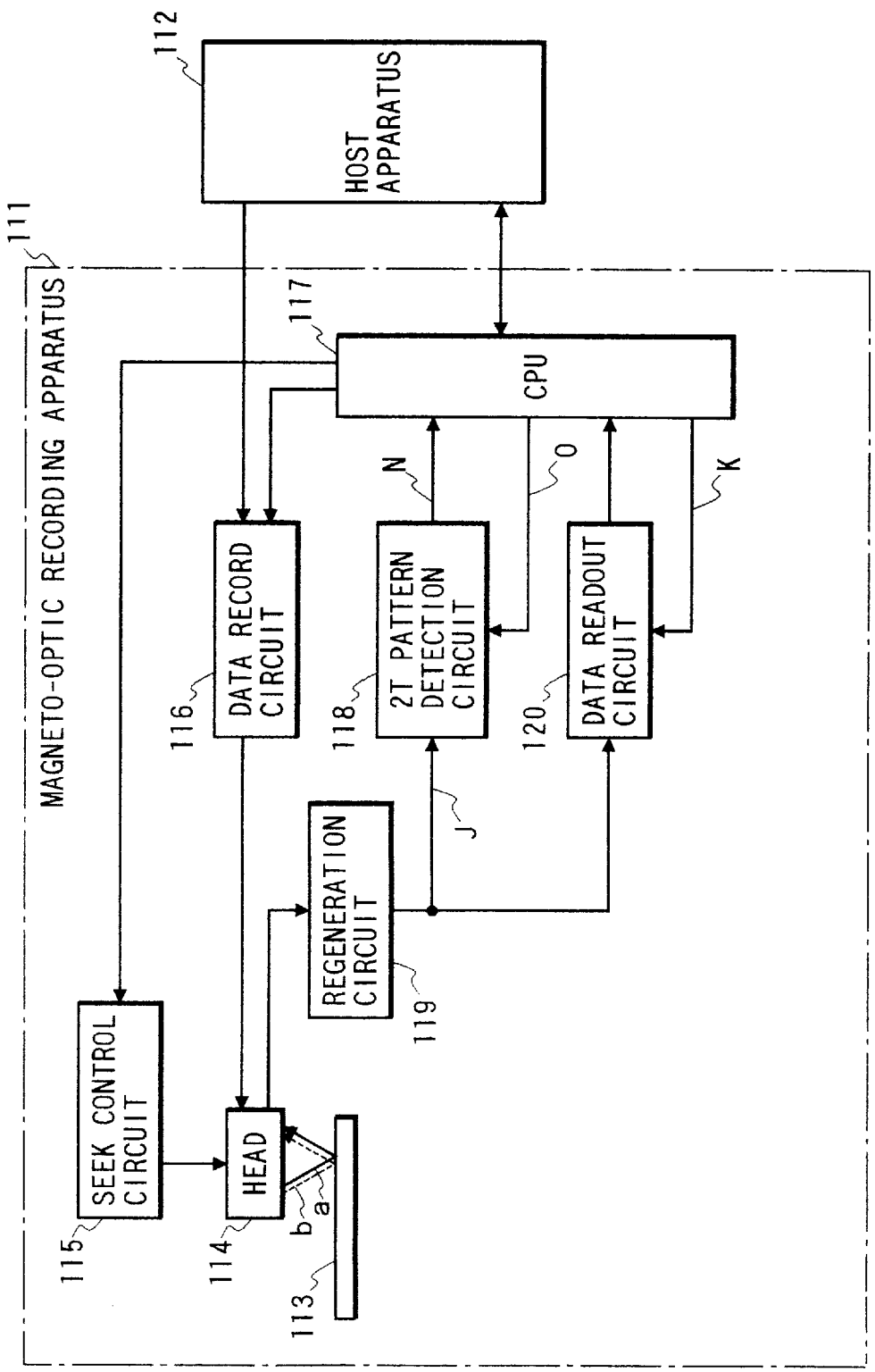
FIG. 14 is a block diagram showing a construction of a magneto-optic recording apparatus in a yet further embodiment of the present invention.

FIG. 14 is a block diagram illustrating a construction of a magneto-optic recording apparatus in accordance with a still further embodiment of the present invention. Referring to FIG. 14, there are shown a magneto-optic recording apparatus 111, and a host device 112 such as a host computer. Herein, the magneto-optic recording apparatus 111 is constructed of a magneto-optical disk 113, a head 114, a seek control circuit 115, a data record circuit 116, a CPU 117, a 2T pattern detection circuit 118, a regenerating circuit 119 and a data readout circuit 120.

Incidentally, this magneto-optic recording apparatus 111 is classified as a CCW system magneto-optic recording apparatus, wherein the head 114 emits two kinds of beams, i.e., a leading beam a and a trailing beam b and receives reflection beams therefrom, and only one write to the optical disk 113 is allowed.

Figure 15:
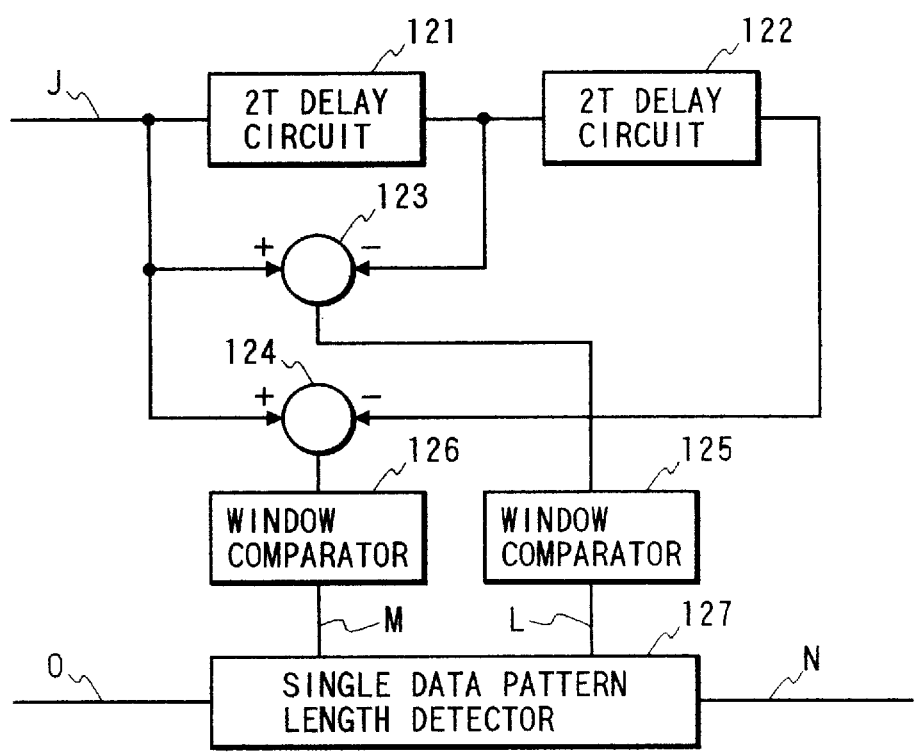
FIG. 15 is a block diagram of a 2T pattern detection circuit, showing the principal portion of the magneto-optic recording apparatus.

Next, FIG. 15 is a block diagram of a configuration of the 2T pattern detection circuit 118, showing the principal portion of the present invention. Herein, this 2T pattern detection circuit 118 inputs a signal J based on the leading beam a and detects a 2T pattern (T is a readout clock period during the regeneration) recorded on the optical disk 113.

Referring again to FIG. 15, the 2T pattern detection circuit 118 is constructed of 2T delay circuits 121, 122, differential detectors 123, 124, window comparators 125, 126, and a single data pattern length detector 127.

Figure 16:
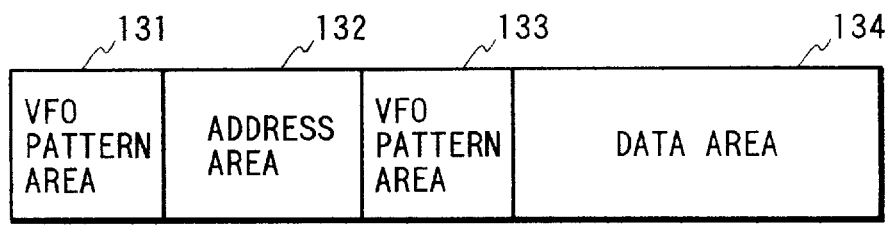
FIG. 16 is a diagram illustrating a configuration of the sector on the optical disk.

Herein, a sector on the magneto-optical disk 113 is, as illustrated in FIG. 16, segmented roughly into an address area 132 and a data area 134, and heads of the respective areas 132, 134 are provided with VFO pattern areas 131, 133. These VFO pattern areas 131, 133 are called PLL lead-in areas. The PLL lead-in areas are areas used when an unillustrated PLL circuit extracts synchro clocks from the regenerative signals of the magneto-optical disk 113. Herein, when the data are recorded in the address area 132 and in the data area 134, these VFO pattern areas 131, 133 are recorded with VFO patterns appearing like a continuation of the above-mentioned 2T patterns.

Then, when actually reading the data, the CPU 117 shown in FIG. 14 controls the seek control circuit 115, thereby moving the head 114 to the sector to be read on the magneto-optical disk 113. An ID of the address area 132 of that sector is thereby detected through the regenerating circuit 119 and the data readout circuit 120. Subsequently, the CPU 117 outputs a data read gate signal K and reads out the data of the data area 134 through the data readout circuit 120. Then, when reading the data out of the address area 132 and the data area 134, the unillustrated PLL circuit generates the synchro clocks from the respective VFO pattern areas 131, 133, and the data subsequent thereto are demodulated by use of these synchro clocks.

The patterns of the VFO pattern areas 131, 133 are such patterns as to synchronize with the data, and the patterns of the respective mark signals positioned backward by a sufficient length to stably lead in the synchro clocks from the PLL circuit.

Herein, in the 2T delay circuit 121, shown in FIG. 15, within the 2T pattern detection circuit 118, the input signal J is delayed by a 2T time of the data cycle thereof. Further, the 2T delay circuit 122 further delays it by the 2T time.

Outputs of the 2T delay circuits 121, 122 are given respectively to the differential detectors 123, 124. The differential detectors 123, 124 take differences with respect to the input signals J and give them to the window comparator circuits 125, 126. The window comparator circuits 125, 126, upon inputting the signals from the differential detectors 123, 124, binarize these signals and output them to the single data pattern length detector 127.

Herein, an output of the window comparator circuit 125 is a 2T data detection signal and becomes a piece of set data L to the single data pattern length detector 127. Further, the window comparator 126, upon inputting a pattern exclusive of the 2T pattern, gives this pattern as a piece of reset data M to the single data pattern length detector 127.

The single data pattern length detector 127 counts the number of times with which the set data,L (set pulse) consecutively occurs, and performs consecutive counting a predetermined number of times. Then, when detecting an occurrence of the 2T pattern with a predetermined number of repetitions, a 2T detection signal N is outputted to the CPU 117. Note that the single data pattern length detector 127 operates only when a data read gate signal O outputted from the CPU 117 is active. The apparatus is thus constructed, and the specified continuous data patterns (2T patterns) can be thereby directly detected without any demodulation.

Thus, the emphasis is that the VFO pattern exists at the head of the data area 134 already recorded with data, and the 2T pattern detection circuit 118 detects the continuation of the VFO patterns defined as continuous single data patterns, whereby it is feasible to promptly determine whether or not data has already been recorded. As a result, a pattern can be correctly detected even if some defect is seen partially in that area. Besides, data is prevented from being overwritten to a sector because of this sector being misjudged as a non-recorded sector, and hence accuracy of protecting the record is enhanced.

Given next is an explanation of operation of the magneto-optic recording apparatus 111 based on the two kinds of beams a and b using the above-described 2T pattern detection circuit 118. Herein, the 2T pattern detection circuit 118, as explained above, is employed upon the leading beam a.

Figure 17:
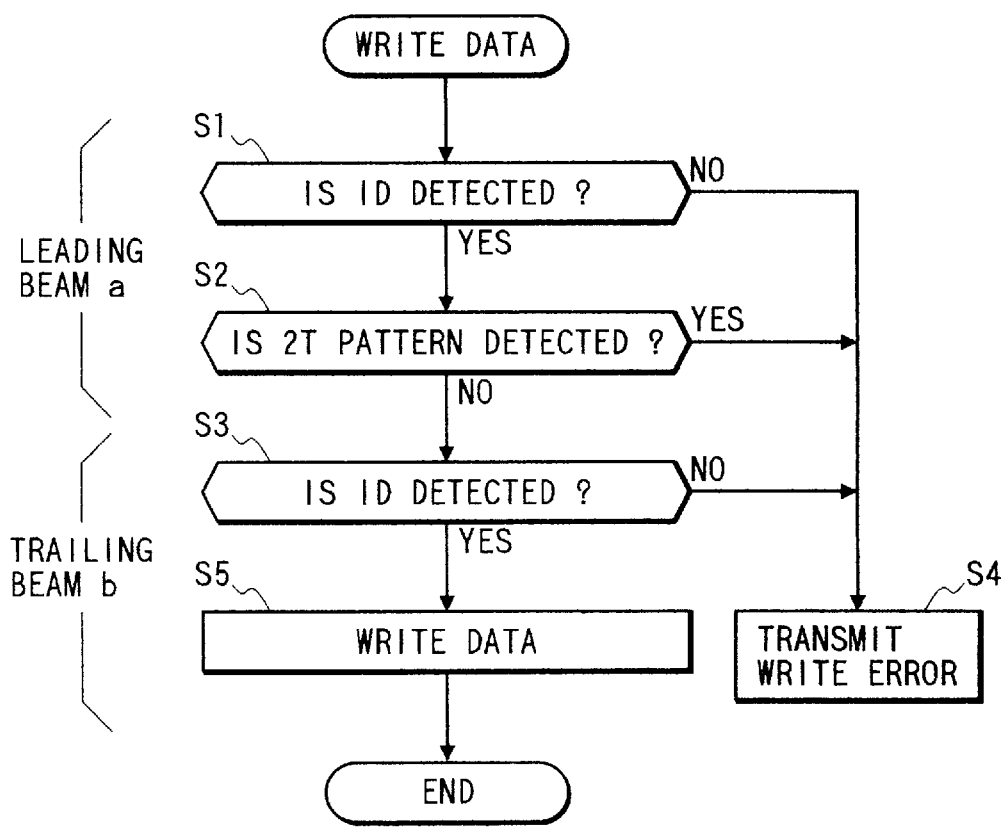
FIG. 17 is a flowchart showing an operation of the principal portion of the magneto-optic recording apparatus.

FIG. 17 is a flowchart showing the operation of the principal portion of the magneto-optic recording apparatus 111 based on the two kinds of beams a and b. Herein, the leading beam a of these two kinds of beams is used for only reading, and the trailing beam b is used in common to reading and writing.

When the host device 112 transmits a data write instruction to this magneto-optic recording apparatus 111, the CPU 117 controls the seek control circuit 115 to shift the position of the head 114, whereby the head 114 is capable of detecting the pattern of the VFO pattern area 131 of a target sector on the optical disk 113 and also the sector address (ID) in the address area 132 by use of the leading beam a. Then, after the 2T pattern detection circuit 118 has detected the pattern of the VFO pattern area 131 of the relevant sector, an ID detection in the address area 132 through the leading beam a is judged in step S1.

Herein, the ID of the relevant sector is detected, and the "ID detection" in step S1 results in "Yes". Hereupon, the CPU 117 controls the seek control circuit 115 so that the ID serving as a target is detected by the trailing beam b, thereby entering an ID detecting process based on the trailing beam b. When the ID is read out through the leading beam a, the CPU 117 outputs the data read gate signal O to the 2T pattern detection circuit 118, whereby the 2T pattern detection circuit 118 detects the 2T pattern of the VFO pattern area 133. Further, the PLL circuit inputs the VFO pattern defined as the 2T pattern, thereby generating the synchro clocks for demodulating the data of the data area 134, which will be regenerated later on.

Then, at this time, whether the 2T pattern is detected or not is determined through the 2T pattern detection circuit 118 in step S2. Herein, when the judgement in step S2 becomes "Yes" upon detecting the 2T pattern, the CPU 117 judges that data has already been written to this sector, and suspends the recording process using the trailing beam b. Then, the CPU 117 informs the host device 112 of a write error in step S4. Further, if the 2T pattern detection signal N is not outputted, the CPU 117 judges that no data is recorded on this sector, and controls the leading beam a to permit this beam to pass directly. Besides, the CPU 117 makes a judgement about the ID detection of the target sector by use of the trailing beam b in step S3. Then, upon detecting the ID, the CPU 117 renders the data area 134 recorded with the data using the trailing beam b in step S5.

Thus, data can be recorded by promptly determining whether or not data has already been recorded by use of the two kinds of beams. The recorded status can be controlled in real time by using the leading beam a, and therefore, data can be promptly recorded with no waiting time for rotations of the magneto-optical disk.

In this case, a beam interval corresponding to at least a single data area may be secured, and operation involving the use of multi-beams is attainable because of less mechanical constraint.

Note that the exemplification using two kinds of beams has been given in this embodiment for the purpose of detecting in multiplex the specified patterns with respect to the data before being demodulated, eliminating anon-useful time. The specified pattern detection circuit (2T pattern detection circuit) exhibits the same effects as in the case of the two kinds of beams even when executed by a single beam.

As discussed above, according to the present invention, the specified pattern detection circuit is provided for detecting the specified pattern existing in the normally recorded data. Consequently, special recording areas for recording recorded data on the recording medium, become unnecessary, and the specified pattern can be detected from the data immediately after being regenerated. Hence, the recorded status can be judged without reading all the data of one sector, and it is therefore possible to promptly determine whether data is recorded or not.

Further, the specified pattern detection circuit detects the continuation of the specified patterns existing within the signals regenerated and inputted, and, when the number of continuations of the specified patterns comes to a predetermined number, executes data-recorded outputting. Therefore, even if a defect exists partially in the medium, the specified patterns can be correctly detected without misreading these patterns. As a result, a sector is prevented from being overwritten because of this sector being misjudged as a non-recorded sector, and the accuracy of protecting the record is enhanced.

Moreover, when a plurality of beams are provided, data is regenerated by use of the leading beam of these beams and recorded by use of the trailing beam. When the number of continuations of the specified patterns comes to the predetermined number during the regeneration of the data, data is inhibited from being recorded. Consequently, the leading beam is capable of checking the recorded status of the recording medium. Then, it is feasible to promptly record data without coming into the standby status for the rotations of the recording medium when recording data, and also to prevent data damage when data has been recorded.

It is apparent that, in this invention, a wide range of different working modes can be formed based on the invention without deviating from the spirit and scope of the invention. This invention is not restricted by its specific working modes except being limited by the appended claims.

What is claimed is:

1. An optical disk apparatus comprising:

a data recording circuit for recording user data in a data portion of a sector on an optical disk, said optical disk having a plurality of tracks formed in a concentric circular shape or spiral shape on the surface thereof and being possible of data write based on a sector unit, each track being segmented into a plurality of sectors;

a detection circuit for detecting a resynchro pattern recorded together with user data from a regenerative signal obtained from the data portion of sector before recording the user data in the sector;

a count circuit for counting a number of resynchro patterns detected; and an overwrite preventive circuit for stopping recording data on the sector when a count value of said count circuit is not less than a predetermined value.

2. The optical disk apparatus according to claim 1, wherein the data portion has a resynchro pattern recording area, and the resynchro pattern is recorded in the resynchro pattern recording area as one-pattern data per several bytes of the user data recorded in the data portion.

3. An optical disk apparatus comprising:

a data recording circuit for recording user data in a data portion of a sector on an optical disk, said optical disk having a plurality of tracks formed in a concentric circular shape or spiral shape on the surface thereof and being possible of data write based on a sector unit, each track being segmented into a plurality of sectors;

a detection circuit for detecting a synchro pattern recorded together with user data from a regenerative signal obtained from the data portion of the sector before recording user data in the sector; and an overwrite preventive circuit for stopping recording the data in the sector when said detection circuit detects a synchro pattern.

4. An optical disk apparatus comprising:

a data recording circuit for recording user data in a data portion of a sector on an optical disk, said optical disk having a plurality of tracks formed in a concentric circular shape or spiral shape on the surface thereof and being possible of data write based on a sector unit, each track being segmented into a plurality of sectors;

a first detection circuit for detecting a synchro pattern recorded together with user data from a regenerative signal obtained from the data portion of the sector before recording user data in the sector;

a second detection circuit for detecting a resynchro pattern recorded together with user data from the regenerative signal obtained from the data portion of the sector before recording user data in the sector; and an overwrite preventive circuit for stopping recording data in the sector based on a detection output of one of said first and second detection circuits.

5. The optical disk apparatus according to claim 4, wherein said second detection circuit detects the resynchro pattern when said first detection circuit does not detect the synchro pattern.

6. The optical disk apparatus according to claim 4, wherein said second detection circuit detects a specified number N (N is an integer not less than 1) of resynchro patterns of the data portion.

7. An optical disk apparatus comprising:

a data recording circuit for recording data in a data portion of a sector on an optical disk, said optical disk having a plurality of tracks formed in a concentric circular shape or spiral shape on the surface thereof and being possible of data write based on a sector unit, each track being segmented into a plurality of sectors;

a data regenerating circuit for regenerating data from a regenerative signal obtained from the data portion of the sector before recording data in the sector;

an error correcting circuit for correcting an error in the data regenerated by said data regenerating circuit and, when possible of correcting the error, generating an error correction OK signal; and an overwrite preventive circuit for stopping recording data in the sector when receiving the error correction OK signal from said error correction circuit.

8. An optical disk apparatus comprising:

a data recording circuit for recording user data and an error correction code in a data portion of a sector on an optical disk, said optical disk having a plurality of tracks formed in a concentric circular shape or spiral shape on the surface thereof and being possible of data write based on a sector unit, each track being segmented into a plurality of sectors;

a data regenerating circuit for regenerating user data and the error correction code from a regenerative signal obtained from the data portion of the sector before recording data in the sector;

an error correcting circuit for correcting an error in user data based on the error correction code regenerated by said data regenerating circuit and, when possible of correcting the error, generating an error correction OK signal; and an overwrite preventive circuit for stopping recording data in the sector when receiving the error correction OK signal from said error correction circuit.

9. An optical disk apparatus comprising:

a data recording circuit for recording data in a data portion of a sector on an optical disk, said optical disk having a plurality of tracks formed in a concentric circular shape or spiral shape on the surface thereof and being possible of data write based on a sector unit, each track being segmented into a plurality of sectors;

a data regenerating circuit for regenerating data from a regenerative signal obtained from the data portion of the sector before recording data in the sector;

an error correcting circuit for correcting an error in the data regenerated by said data regenerating circuit;

a detection circuit for detecting a resynchro pattern from the regenerative signal;

a count circuit for counting the number of resynchro patterns detected; and an overwrite preventive circuit for stopping recording data in the sector when a count value of said count circuit is not less than a predetermined value or when said error correction circuit is capable of correcting the error.

10. An optical disk apparatus comprising:

a data recording circuit for recording user data and an error correction code in a data portion of a sector on an optical disk, said optical disk having a plurality of tracks formed in a concentric circular shape or spiral shape on the surface thereof and being possible of data write based on a sector unit, each track being segmented into a plurality of sectors;

a data regenerating circuit for regenerating user data and the error correction code from a regenerative signal obtained from the data portion of the sector before recording data in the sector;

an error correcting circuit for correcting an error in user data based on the error correction code regenerated by said data regenerating circuit;

a detection circuit for detecting a resynchro pattern from the regenerative signal;

a count circuit for counting a number of resynchro patterns detected; and an overwrite preventive circuit for stopping recording data in the sector when a count value of said count circuit is not less than a predetermined value, or when said error correction circuit is capable of correcting the error.

11. An optical recording apparatus comprising:

a data recording circuit for recording data on a recording medium;

a data regenerating circuit for regenerating the data recorded on the recording medium;

a specified pattern detection circuit for detecting a specified pattern indicating that data has already been recorded on the recording medium; and an overwrite preventive circuit for stopping recording data when the specified pattern detection circuit detects said specified pattern indicating that data has already been recorded on the recording medium.

12. The optical recording apparatus according to claim 11, wherein said specified pattern detection circuit detects the specified patterns existing in signals regenerated and inputted and, when a number of specified patterns becomes a predetermined number, gives forth a data-recorded output.

13. An optical recording apparatus comprising:

a data recording circuit for recording data on a recording medium;

a data regenerating circuit for regenerating the data recorded on the recording medium;

a specified pattern detection circuit for detecting a specified pattern indicating that data has already been recorded on the recording medium;

a beam generating device for generating a plurality of beams, said data regenerating circuit regenerating data by use of a leading beam of the plurality of beams, said data recording circuit recording data by use of a trailing beam of the plurality of beams; and a circuit for hindering said data recording circuit from recording data when a number of detected specified patterns reaches a predetermined number during the regeneration of data.

* * * * *